B. PHELPS.
PICTURE EXHIBITOR.
APPLICATION FILED SEPT. 14, 1909.
970,947.
Patented Sept. 20, 1910.
2 SHEETS—SHEET 2.
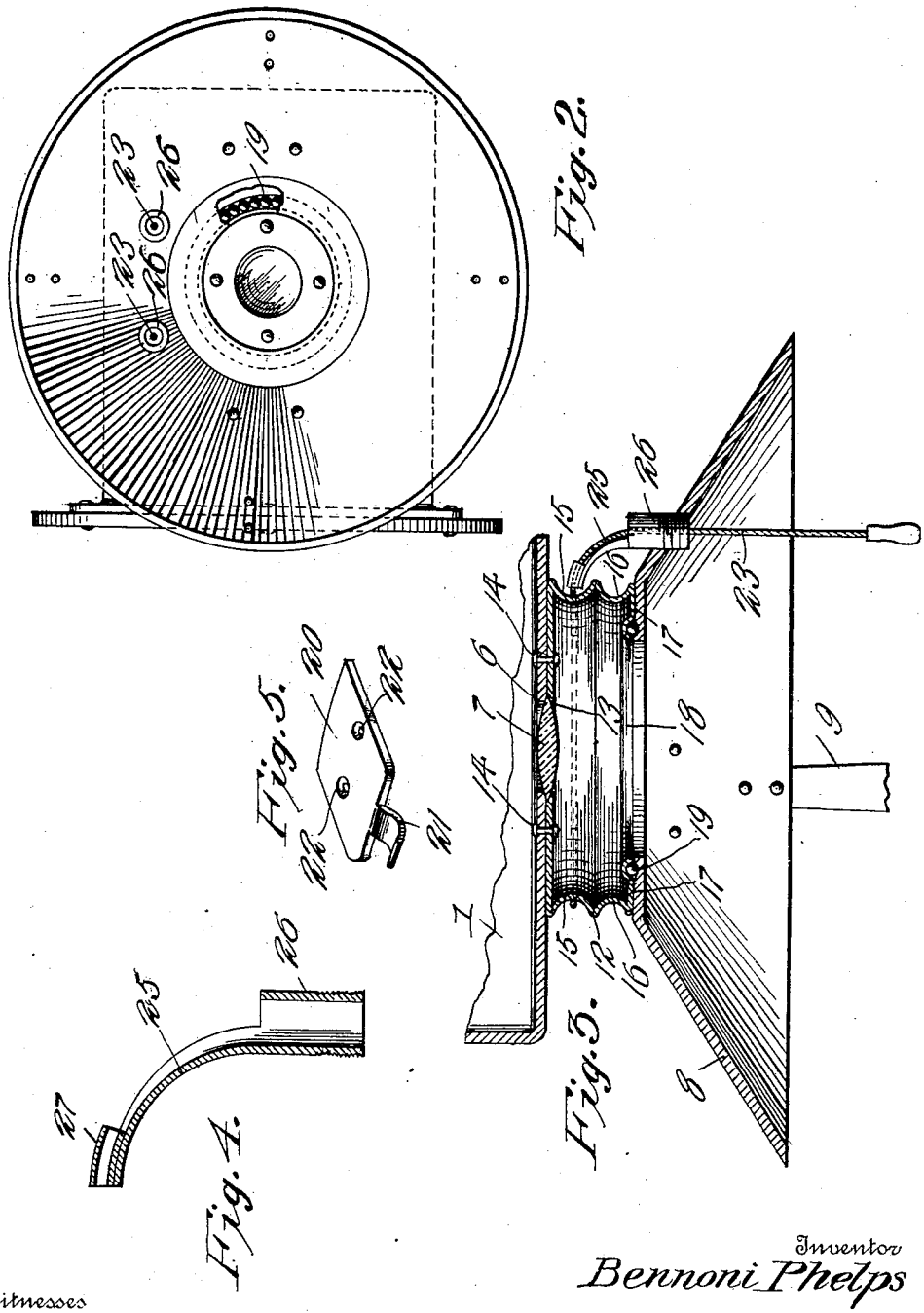
Witnesses
James F. Crown
Inventor
Bennoni Phelps
By Victor J. Evans
Attorney

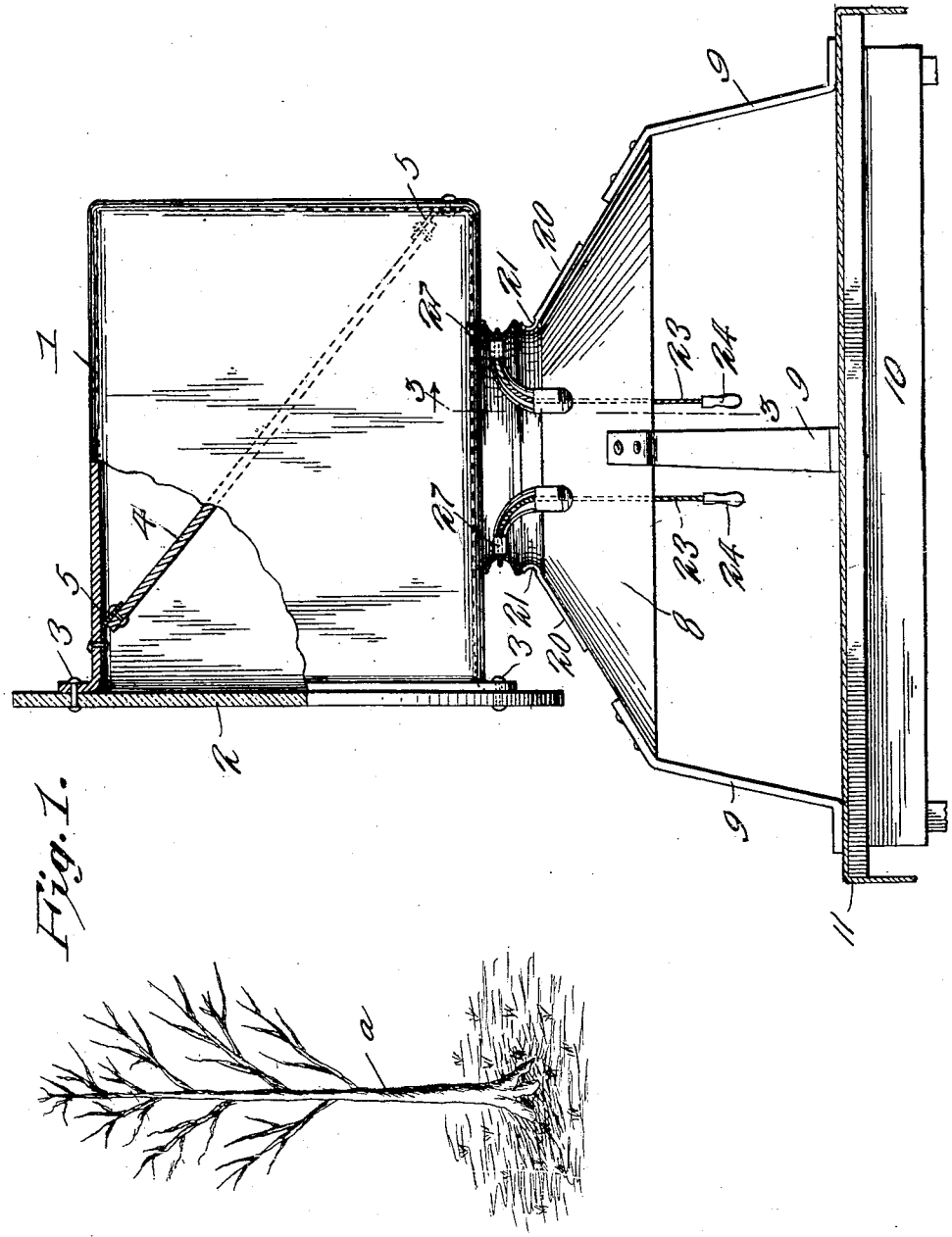

UNITED STATES PATENT OFFICE.

BENNONI PHELPS, OF HAWARDEN, IOWA.

PICTURE-EXHIBITOR.

970,947.  Specification of Letters Patent. Patented Sept. 20, 1910.

Application filed September 14, 1909. Serial No. 517,642.

*To all whom it may concern:*

Be it known that I, BENNONI PHELPS, a citizen of the United States of America, residing at Hawarden, in the county of Sioux and State of Iowa, have invented new and useful Improvements in Picture-Exhibitors, of which the following is a specification.

This invention relates to picture exhibitors of that type known as the "camera-obscura," and one of the principal objects of the same is to provide a simple apparatus for displaying moving objects or pictures upon a plane surface within a darkened room or compartment.

Another object of the invention is to provide an apparatus for projecting objects upon a tablet in position to be seen by a number of persons at the same time.

Still another object of the invention is to provide an apparatus having a camera mounted to rotate upon a stand and provided with an inclined reflector to project an object or picture through a lens on to a tablet, said tablet being in plain view to accommodate a large number of persons.

These and other objects may be attained by means of the construction illustrated in the accompanying drawings, in which,—

Figure 1 is a side elevation of an apparatus made in accordance with my invention, a portion of the same being broken away and a tree being shown in position to be reflected through the instrument. Fig. 2 is a bottom plan view of the same. Fig. 3 is a detail sectional view on the line 3—3 of Fig. 1, looking in the direction indicated by the arrow. Fig. 4 is a detail sectional view of a cord guide to be hereinafter referred to. Fig. 5 is a detail perspective view of a guide plate, to be referred to hereinafter.

Referring to the drawings, the numeral 1 designates a camera comprising a box of suitable size and shape having a glass side or end 2 secured thereto by means of rivets or suitable fastenings 3. Within the box or camera is a reflector plate 4 preferably disposed at an angle of about 50 degrees from the horizontal, said plate being secured by means of metal brackets 5 within the box. In the bottom of the box or camera a circular aperture 6 is formed, and secured within this aperture is a convex lens 7. The box 1 is mounted upon a reflector 8 provided with legs 9 supported upon a suitable table 10 provided with a cover 11. The box or camera 1 has secured to its underside a metal connection 12 provided with a central aperture 13 in line with the lens 7, said connection being secured by means of suitable fastenings 14 to the camera 1. This connection is provided with an annular groove 15 near the camera and a similar groove 16 adjacent to the reflector 8. An inwardly projecting flange 17 is provided with an annular ball race 18, and a series of balls 19 are interposed between the ball race and a groove in the upper surface of the reflector 8, as shown in Fig. 3. To hold the connection 12 in connection with the reflector guide plates 20 are provided, said plates each having a curved tongue 21 to bear in the groove 16 of the connection, said plates being provided with screw holes 22 for securing the plates upon the outer surface of the reflector 8 by means of screws passing through said holes and through said reflector. In order to rotate the camera relatively to the reflector a cord 23 is provided at its ends with handles 24, said cord passing through curved guide members 25 and around the groove 15 of the connection 12. The cord guides 25 are each provided with a threaded tube 26 fitted in the reflector, as shown in Fig. 3. By pulling upon one or the other of the handles 24 the camera 1 may be rotated to present different objects to the reflector 4 and through the lens upon the cover 11. The cord guides 25 are each provided with a guide tube 27 at its upper end through which the cord passes and from which the cord extends around the groove 15 in the connection 12.

The operation of my invention may be briefly described as follows:—

The apparatus is adapted to be set up for exhibition in a darkened tent or room with the camera extending through an aperture to receive the object to be displayed. In Fig. 1 a tree $a$ is shown, and this tree would be received through the glass 2 upon the reflector 4 and from thence cast through the lens 7 on to the tablet or cover 11 upon the table 10 in full view of a number of persons within the tent or room. It will be understood, of course, that the reproduction is greatly reduced in size. The camera may be rotated to present new objects.

From the foregoing it will be obvious that an apparatus made in accordance with my invention can be produced at low cost and will prove highly entertaining to quite a number of people at the same time. It is to be understood that the reflector 8 has its inner face highly polished so as to cast a reflection upon the cloth 11. It will be further noted that the outer portion of the said reflector 8 provides a hook which excludes a degree of light rays external to those which are reflected from the object upon the table, thus rendering the object more discernible.

I claim:—

1. In an apparatus of the character described comprising a camera having an inclined reflector therein, a lens connected to the bottom of said camera, a connection surrounding said lens, a flaring reflector provided with feet and upon which said connection is supported upon ball bearings, a cord passing around the connection and provided with handles for rotating the camera upon the flaring reflector.

2. In an apparatus of the class described, the combination with a camera or box having a glass side and an inclined reflector therein, the bottom of the box being provided with a lens, a connector surrounding the lens and having its outer surface provided with annular depressions, cord members secured to these depressions, a flaring reflector upon the lower face of the connector, offset plate members connected with the reflector and engaging the bottom annular recess of the connector, the cords of the connector extending within the reflector, and feet for the reflector, substantially as and for the purpose set forth.

3. A substantially rectangular box having an open face, said box being provided with offsets adjacent its open face, a glass connected with this face, the box being provided upon its top and rear with inclined brackets, a reflector secured to said brackets, the bottom of the box being provided with an opening, a lens for this opening, a connector for the bottom of the box surrounding the lens, said connector comprising an annular member having a pair of spaced annular depressions upon its outer surface, a cord connected with the upper annular depression of the connector, a flaring reflector, said reflector having its upper portion provided with plates having curved lips and adapted to engage the lower annular depression of the connector, feet for the flaring reflector and the cords of the connecting member passing through the reflector and having their ends provided with handles.

In testimony whereof I affix my signature in presence of two witnesses.

BENNONI PHELPS.

Witnesses:
　E. W. FISKE,
　BERTHA M. REINECKE.